Figure 1:
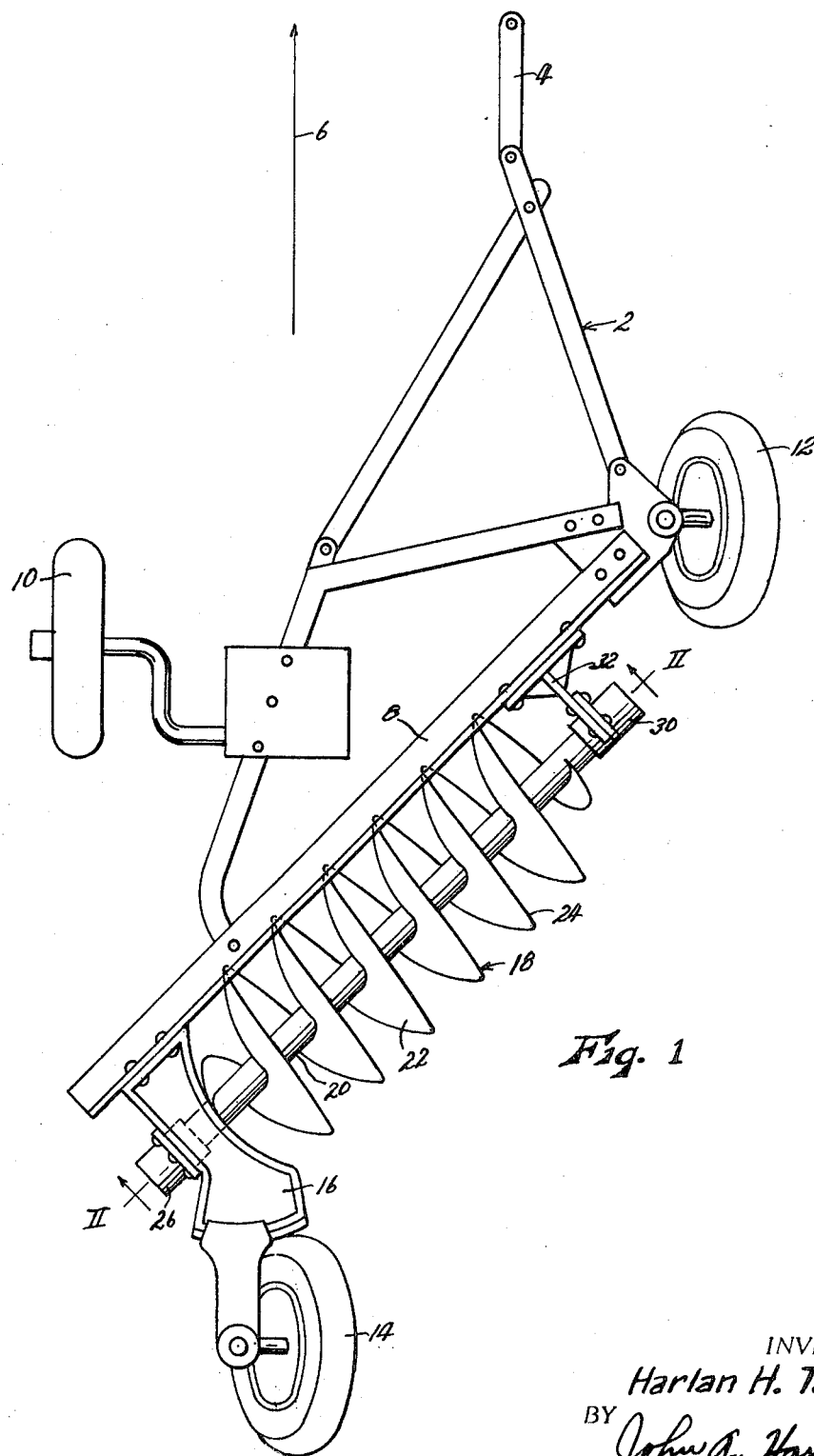

United States Patent [19]
Tatge

[11] 3,735,817
[45] May 29, 1973

[54] HELICAL PLOW
[76] Inventor: Harlan H. Tatge, 118 N. Broadway, Herington, Kans. 67449
[22] Filed: Dec. 28, 1970
[21] Appl. No.: 101,940

[52] U.S. Cl..............................172/532, 172/604
[51] Int. Cl..............................................A01b 5/00
[58] Field of Search......................172/119, 532, 604

[56] References Cited
UNITED STATES PATENTS

| | | | |
|---|---|---|---|
| 1,077,288 | 11/1913 | McKee | 172/604 |
| 3,005,501 | 11/1961 | Frank | 172/604 |
| 1,836,984 | 12/1931 | Newsom | 172/532 |
| 2,037,738 | 4/1936 | Porter et al | 172/532 |
| 404,291 | 5/1889 | Dow | 172/532 |
| 2,030,034 | 2/1936 | Newsom | 172/532 |
| 352,956 | 11/1886 | Newsom | 172/532 |
| 2,649,723 | 8/1953 | Tubbs | 172/532 |
| 1,007,399 | 10/1911 | Spalding | 172/604 |

Primary Examiner—Robert E. Pulfrey
Assistant Examiner—R. T. Rader
Attorney—John A. Hamilton

[57] ABSTRACT

A plow consisting of a wheeled frame and a helical plow share resembling an auger carried rotatably by said frame on a horizontal axis which is horizontally angled relative to the direction of travel of said frame, the convolutions of said plow share being radially concave at the sides thereof facing the forward end of said plow share.

1 Claim, 3 Drawing Figures

INVENTOR.
Harlan H. Tatge
BY John A. Hamilton
Attorney.

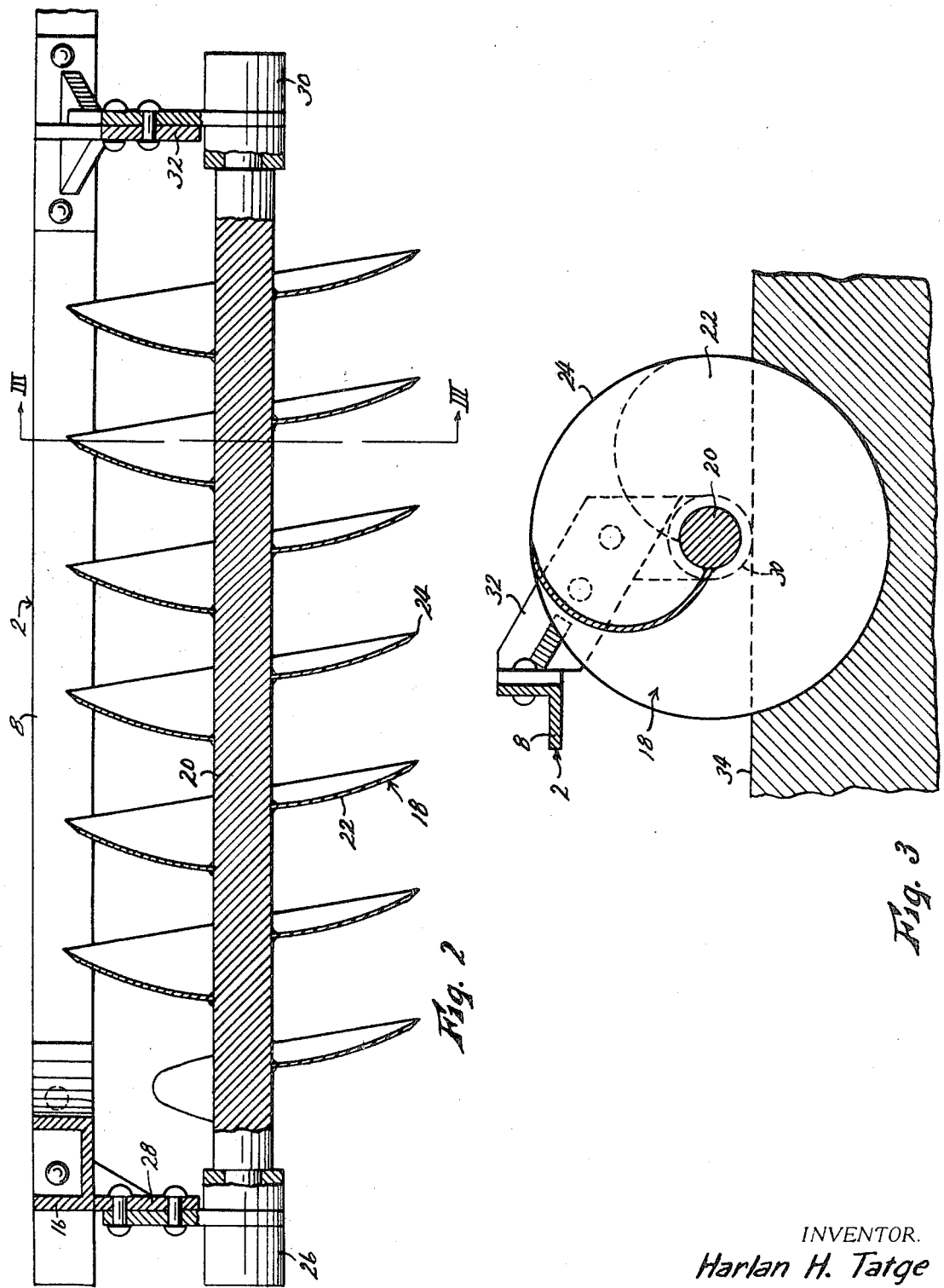

HELICAL PLOW

This invention relates to new and useful improvements in plows, and has particular reference to a plow the plow share of which resembles a helical auger carried rotatably on a horizontal axis inclined relative to the direction of travel.

Plows, commonly known as disc plows, are already in common usage, consisting of a series of spaced discs fixed on a horizontal shaft carried rotatably by a wheeled frame, and disposed angularly to the direction of travel, said discs being operable to penetrate the ground as the plow moves forwardly, said discs commonly being concavo-convex in form, with their concave faces directed toward the forwardmost end of the shaft. However, disc plows of this type have been subject to certain disadvantages and shortcomings in operation. First, they commonly do not have good draft or "suction" characteristics, this being the action which causes the plow share, once introduced into the ground, to be drawn downwardly to and maintained at the desired plowing depth. Hence, particularly in harder ground, they have a tendency to "drag" along the ground surface, or at a depth less than intended, with a consequently inefficient operation. Second, disc plows of the usual type are usually inefficient in actually turning the soil, whereby to bury the surface vegetation, as is usually desired. Due to inherent characteristics of the disc units, they cannot to any appreciable degree "overhang" the earth furrow as it is turned, and therefore cannot increase the degree of turning beyond vertical, so that the furrow, if turned at all, is merely turned to a vertical position and left standing on edge. Sometimes, in fact, the soil is not turned at all, but merely loosened and moved transversely.

Accordingly, the principal object of the present invention is the provision of a plow which, while functioning on the same general principles as a conventional disc-type plow, nevertheless has greatly improved draft and earth-turning characteristics. To this end, the usual spaced concavo-convex discs are replaced with a helical flight in the general form of an auger, the outer edge of which is sharpened, arranged coaxially with the axis of rotation, and which extends the full length of the shaft usually occupied by the discs. The convolutions of the auger may be spaced similarly to the usual discs, and are similarly concavo-convex. This increases the horizontal component of the upper surfaces of the portions of the convolutions buried in the earth at any moment, as compared to that available in discs, and therefore increases the downward draft or "suction" force of the earth against said convolutions, and also causes the portions of the convolutions above the ground to overhang the earth furrows being turned, in the direction of turning, thereby increasing the degree of turning of said furrows.

Other objects are simplicity and economy of construction, and efficiency and dependability of operation.

With these objects in view, as well as other objects which will appear in the course of the specification, reference will be had to the accompanying drawing, wherein:

FIG. 1 is a top plan view with parts omitted, of a helical plow embodying the present invention, FIG. 2 is an enlarged, fragmentary sectional view taken on line II—II of FIG. 1, and FIG. 3 is a sectional view taken on line III—III of FIG. 2.

Like reference numerals apply to similar parts throughout the several views, and the numeral 2 applies generally to the frame of a plow embodying the present invention. The details of construction of said frame are not pertinent to the present invention, except that it is disposed generally horizontally, is provided at its forward end with a hitch bar 4 by which it may be connected to a tractor or the like and drawn forwardly, its direction of travel being indicated by arrow 6, is supported above the ground by ground-engaging wheels, and includes a horizontal angle iron bar 8 adjacent its rearward end. Bar 8 is horizontal, but is angled obliquely with respect to the direction of plow travel, said bar being angled forwardly to the right as shown. The ground-engaging wheels include left and right front wheels 10 and 12, and a rear wheel 14 carried at the rearward end of an arm 16 fixed to and projecting rearwardly from the left end portion of bar 8. Means may, and ordinarily would, be provided for adjusting said wheels vertically with respect to frame 2, whereby to adjust and limit the plowing depth of the plow share 18 carried by frame 2, and also for turning certain of said wheels, usually wheels 12 and 14, on a vertical axis relative to the frame whereby to steer the plow. However, said wheel adjusting and steering means are common and well known in the art and in themselves are not pertinent to the present invention, and are therefore not shown.

The plow share indicated generally by the numeral 18 consists of a straight shaft 20 and a helical flight 22 of thin plate metal arranged concentrically with and affixed to said shaft. The continuous peripheral edge 24 of said flight defines a cylinder coaxial with shaft 20, and is sharpened to a keen edge as shown. Shaft 20 is disposed behind, below and parallel to bar 8, being journalled rotatably at its left end in a bearing 26 affixed to a leg 28 depending from frame arm 16, and at its right end in a bearing 30 affixed to a leg 32 angling downwardly and rearwardly from bar 8. As best shown in FIG. 2, flight 22 is radially concavo-convex in form, every radial line thereof being arcuately curved about a point lying substantially at the axis of shaft 20. The concave face of each convolution of the flight faces toward the right, or forward end of shaft 20. The angular extent of the curvature is such that a line tangent to any point on the periphery of the flight and intersecting the axis of shaft 20 will be disposed at the same angle to said shaft axis as the angle of said shaft to the direction of plow travel. For example, if shaft 20 is disposed at 45° to the direction of plow travel, then a tangent to any point on the periphery of the flight should intersect shaft 20 at 45°. The direction of twist of flight 22 should be such that the portions of the forward or concave faces of its convolutions below shaft 20 are angled generally to the right and forwardly from the shaft, while the portions of said faces above shaft 20 are angled generally to the right and rearwardly from the shaft. In other words, if as shown the right end of shaft 20 is its forward end, flight 22 should have a left-hand twist, while if the left end of shaft 20 were its forward end, the flight would necessarily have a right-hand twist.

In operation, the plow is pulled forwardly in the direction of arrow 6, by a tractor or the like to which hitch bar 4 is connected, with the elevation of wheels 10, 12, and 14 so adjusted that as the plow share 18 moves forwardly in its horizontally angled position, the lower portions of the convolutions of flight 22 extend below the ground surface 34, as shown in FIG. 3. FIG. 3 shows the maximum depths to which the plow may be set, this being a position at which shaft 20 is disposed at or just above the normal ground level. During this movement, ridges or furrows of earth enter between each adjacent pair of convolutions of flight 22, or more accurately, the flight moves forwardly to engage said furrows of earth between the convolutions thereof. This entry of the earth furrows is facilitated, as well as by the rotation of the plow share to be later described, by the fact that the leading edge portions of the flight convolutions extend substantially parallel to the direction of plow travel. It is for this reason that the radial tangents of every point of the flight edge are related to the shaft 20 at an angle equal to the angle of shaft 20 to the direction of travel. Thus each convolution initially penetrates the earth as a knife blade with its plane parallel to its travel, not as a comparatively blunt wedge, and said initial penetration is thus rendered as easy and efficient as possible. Of course, this optimum angle of blade penetration is not possible at all plowing depths, since it varies continuously along the lower front quadrant of each flight convolution. However, the proportions shown provide the described optimum angle of penetration when the plow is set for maximum depth, at which time the resistance to penetration is greatest.

As the earth furrows enter between successive convolutions of flight 22, they exert a strong force against the forward or concave faces of the convolutions. This force has at least four important components, a first force to the rear, a second force to the left, a third force tending to rotate the plow share, and a fourth downward force. The rearward force of course represents the load of pulling the plow, and must be overcome by the tractor pulling the plow. The second force to the left, resulting from the horizontal inclination of the concave share faces forwardly to the right, must be resisted to keep the plow in line, and this resistance is supplied by the wheels. Wheel 10 ordinarily rolls on unplowed ground, and has little resistance to lateral displacement. However, the plow turns the furrows to the right, so that the leftmost convolution of flight 22 opens a trench in the ground which remains open behind the plow, and wheel 12 engages in the said trench formed by the plow on its last previous pass over the field, while wheel 14 rides in the said trench just formed. Also, wheels 12 and 14 may be canted downwardly to the left as shown, whereby to engage the left walls of said trenches to still better resist forces exerted on the plow to the left. This wheel arrangement is already common in disc-type plows.

The third force exerted by the earth against the plow share convolutions, tending to rotate the plow share, causes forward rotation of the plow share, allowed by rotation of shaft 20 in bearings 26 and 30. That is, the lower portions of flight 22 move rearwardly, while its upper portions move forwardly. This rotation causes a downward slicing motion of the sharpened edge of the flight as it initially enters the ground, thereby providing easier and more efficient initial penetration of the ground, as previously mentioned. More importantly, it will be seen that due to the horizontally angled position of the plow share relative to its direction of travel, it rotates at a different speed (i.e., faster) than it would if disposed normally to the direction of travel and simply rolling, since the earth furrows must of course move rearwardly between the share convolutions at a speed substantially equal to the speed of travel. Hence, any point on the faces of the share convolutions travels at a different speed than the earth engaging it, and the resulting relative movement or slippage between the earth and plow share prevents sticking and clogging of the earth between the share convolutions, and also loosens the soil. Thus the rotation, and speed differential, are essential. If these functions were not present, the plow would immediately become hopelessly clogged. Although the optimum angle of inclination of shaft 20 relative to the direction of travel is not particularly critical, about 45°, as shown, has been found to produce optimum results. If arranged either more nearly transverse to the line of travel, or more nearly parallel with the line of travel, the rotational driving force on the plow share is reduced, and clogging could result.

The fourth or downward force exerted by the earth on the concave faces of the share convolutions constitutes the draft or suction force which draws the plow share downwardly into the earth as far as permitted by wheels 10, 12, and 14, this being the desired plowing depth, and maintains it at that depth as the plow is moved forwardly. This suction force may be considered as being exerted on a horizontal surface equal in area to the vertical projection of the buried portions of the concave faces of the convolutions of flight 22 on to a horizontal surface.

As the furrows of earth move rearwardly in the spaces between successive convolutions of flight 22, they are turned, due to the corkscrew shape of the spaces, to a position in which the surface of the furrow which originally defined the normal ground surface is disposed generally transversely to the direction of travel and in a generally vertical plane, in which position the furrow emerges from the plow share. Often it is pulled somewhat above the normal ground level by the upward drag of the plow share thereon, and then falls back down after it emerges from the share. If it has been turned sufficiently in this manner, say somewhat more than 90°, it will continue to turn by gravity as it emerges from the plow share and settles to the ground, so that the original surface with its surface vegetation is turned under and buried, as is usually desired. If it is not turned to this degree by the plow shares, the furrows may tend to fall back to an upright position by gravity, as they emerge from the share, or they may in effect be left "standing on edge" with the original ground surface steeply inclined over even vertical. In either case the surface vegetation is left exposed instead of being turned under, and this is not desirable.

In comparing the present plow to an ordinary disc-type plow which, in place of the helical flight 22 here shown, includes a series of spaced apart concavo-convex discs affixed to shaft 20 in planes generally normal thereto, it will be seen that the present plow provides both a stronger draft or suction force, and also turns the furrows farther to virtually insure that the furrows will be turned completely over to turn the surface vegetation under, which the ordinary disc-type plow often does not accomplish. The stronger draft is provided by the fact that, due to the helical shape, the horizontal component of the concave faces buried in and pressed against by the soil at any moment, extends longitudinally of shaft for the full distance or lead between two successive convolutions, and is therefore greater than the corresponding area available in a disc-type plow, which extends longitudinally of the shaft only to the extent of the depth of the concavity of a single disc. This great area results in a greater downward force or suction on the plow share, thereby defeating the tendency of disc-type plows not to attain and maintain the desired plowing depth as pre-set by adjusting wheels 10, 12, and 14 vertically with respect to frame 2. The greater turning effect is provided by the fact that, due to the helical flight shape, the upper rear quadrant of each convolution extends forwardly and to the right to "overhang" of the earth furrow ahead of that convolution as said furrow rises above the normal ground level, causing the furrow to be turned still further as it rises above the normal ground level, so that the turning of the furrow positively accomplished by the plow share amounts to substantially more than 90°, and can be completed to substantially a full 180° by gravity as the furrow emerges from the rearward edge of the plow share. The degree of "overhang" of the upper rear quadrants of the flight convolutions is about twice as great with the helical flight shown as with comparable discs.

In either the disc-type or the present plow, the angle of shaft 20 is more or less dictated by the necessity that the plow share rotate to provide clearance of earth from between the discs, or between the helical convolutions in the present plow. This angle in turn generally limits the angular extent of the curvature of the discs or convolutions, as the case may be, and hence the depth of the concavities thereof, in order to maintain the proper angle of attack (i.e., substantially parallel to the direction of movement) of the forward edges of the discs or convolutions. Both the draft and furrow turning functions of an ordinary disc plow could in fact be improved if the angular extent of the curvature of the discs, and hence the depth of the concavities thereof, could be increased, as this would increase both the disc area on which the earth could exert its downward force, and also increase the overhang of the upper rear quadrants of the discs to increase the turning action. However, for the reasons given above, this increase in the curvature is not possible in a disc-type plow. The present helical plow share, on the other hand, accomplishes both purposes, providing both a greater area for draft froces to act upon and also a greater overhang in the upper rear quadrant to increase the turning action, without at the same time increasing the angular extent of the radial curvature of the convolutions, so that the proper angle of attack is maintained. It has been found that a precisely circularly arcuate form of a generating line of the helical plow share is not critically essential to the basic concept of my invention. During the experimentation conducted before preparation of this application, generally satisfactory results were obtained with models in which a generating line of the helix varied substantially from the precise arc of a circle. Precise curvature was difficult to obtain with the hand methods used and several models were actually built and tested before a reasonably accurate circularly arcuate curvature was produced. Shares with a substantially accurate arcuate curvature did perform better, particularly in the aspects of more reliably inverting the furrows to bury the surface vegetation, in loosening or breaking the soil more thoroughly, and in reducing the draft force required to pull the plow. Therefore, the term "concavo-convex" as used herein, should not of itself be interpreted to denote an exactly circular curvature, but to include any smooth, continuous curvature in the same direction, with no sudden, sharp changes in degree or radius of curvature.

While I have shown and described a specific embodiment of my invention, it will be readily apparent that many minor changes of structure and operation could be made without departing from the spirit of the invention.

What I claim as new and desire to protect by Letters Patent is:

1. In a plow including a wheeled frame adapted to be towed over the ground, a plow share comprising:
   a. a shaft carried for axial rotation by said frame, said shaft being horizontal but angled acutely to the direction of travel of said plow, and
   b. a helical flight of plate metal sharpened at its peripheral edge affixed concentrically to said shaft, said flight being disposed at an elevation relative to such frame such that the lower portion thereof is disposed beneath the ground level, the direction of twist of said flight being such that the relatively forward surfaces of the convolution thereof face generally in a direction angled forwardly from the axis of said shaft, said flight being uniformly concavo-convex in cross-sectional contour radially to said shaft, the relatively forward surface thereof being concave and the relatively rearward surface thereof being convex, a generating line thereof at its intersection with a plane including the axis of said shaft being arcuately curved about a center of curvature lying substantially at the axis of said shaft, the angular extent of said generating line, measured from the axis of said shaft, being substantially equal to the horizontal angle at which said shaft is disposed to the direction of plow travel.

* * * * *